United States Patent
Saito

(10) Patent No.: US 8,760,689 B2
(45) Date of Patent: Jun. 24, 2014

(54) COMPUTER READABLE DEVICE STORING PRINT CONTROL PROGRAM, PRINT CONTROL APPARATUS AND PRINT CONTROL METHOD

(75) Inventor: Takuma Saito, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 259 days.

(21) Appl. No.: 13/073,389

(22) Filed: Mar. 28, 2011

(65) Prior Publication Data
US 2011/0261400 A1     Oct. 27, 2011

(30) Foreign Application Priority Data

Apr. 27, 2010   (JP) .................................. 2010-102267

(51) Int. Cl.
*G06F 3/12*     (2006.01)
*G06K 15/00*    (2006.01)

(52) U.S. Cl.
USPC .......... 358/1.15; 358/1.1; 358/1.13; 358/1.14

(58) Field of Classification Search
None
See application file for complete search history.

(56) References Cited

U.S. PATENT DOCUMENTS

| | | | |
|---|---|---|---|
| 6,982,804 B2 | 1/2006 | Frolik et al. | |
| 2005/0088681 A1* | 4/2005 | Hosoda | 358/1.14 |
| 2008/0180712 A1* | 7/2008 | Selvaraj | 358/1.13 |
| 2008/0304092 A1* | 12/2008 | Ebuchi | 358/1.13 |
| 2009/0303515 A1 | 12/2009 | Imai | |

FOREIGN PATENT DOCUMENTS

| | | |
|---|---|---|
| JP | 2008-186464 | 8/2008 |
| JP | 2009-301127 | 12/2009 |

OTHER PUBLICATIONS

Office Action issued in corresponding Chiniese Patent Application No. 201110112574.4 dated Jun. 24, 2013.

* cited by examiner

*Primary Examiner* — Marivelisse Santiago Cordero
*Assistant Examiner* — Moustapha Diaby
(74) *Attorney, Agent, or Firm* — Banner & Witcoff, Ltd.

(57) ABSTRACT

A computer readable device storing print control instructions to be executed by a computer communicatively connected to at least one printer via a network is provided. The print control instructions comprise at least a monitoring program. The monitoring program, when executed by the computer, causes the computer to function as: a monitoring module configured to monitor setting information in which location information of the printer on the network is written to detect writing of the location information, and a port setting module configured to, upon detection of the writing of the location information, set a logical print port having the written location information set therein as a print port to be used.

20 Claims, 5 Drawing Sheets

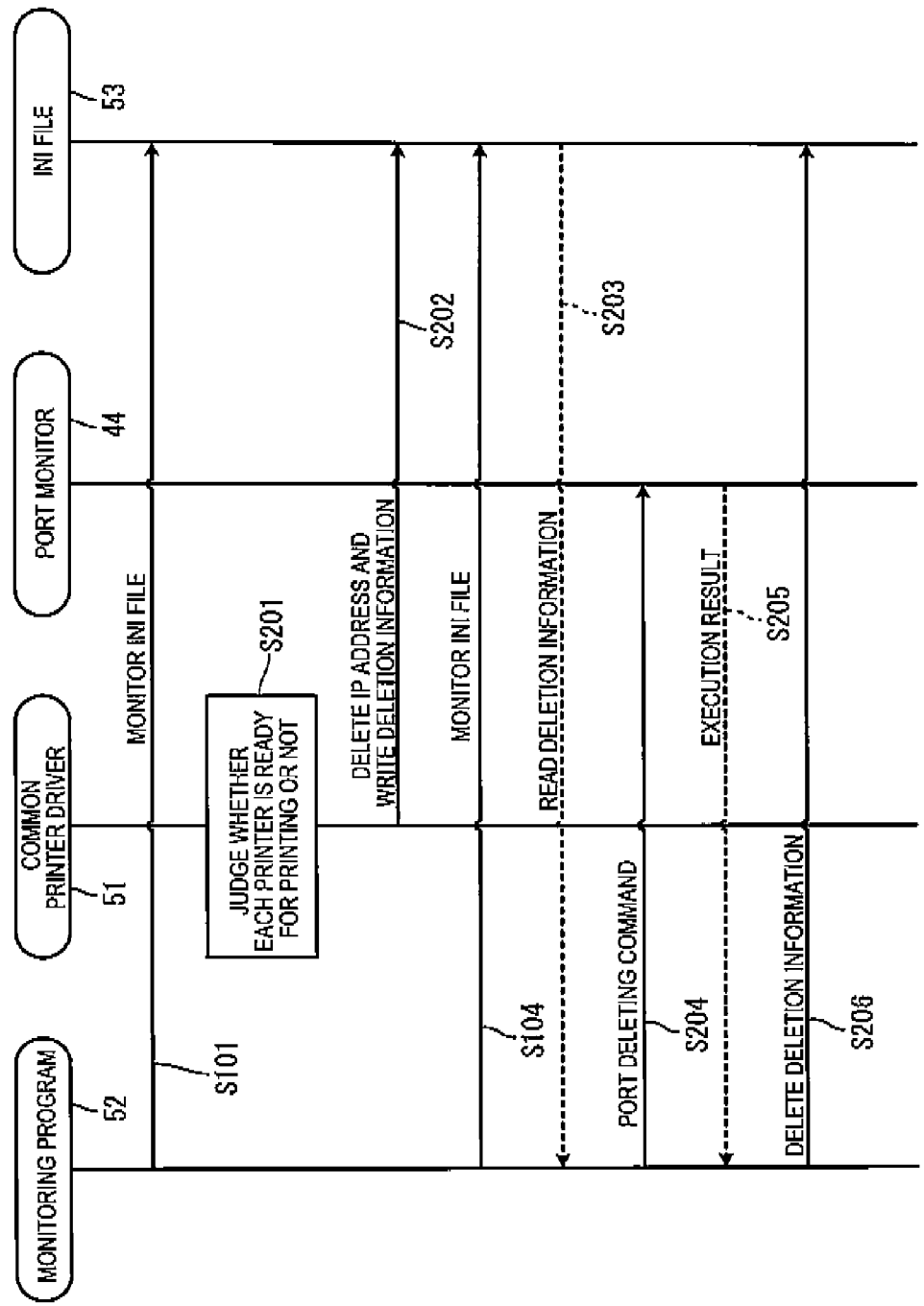

COMPUTER READABLE DEVICE STORING PRINT CONTROL PROGRAM, PRINT CONTROL APPARATUS AND PRINT CONTROL METHOD

CROSS REFERENCE TO RELATED APPLICATION

The present application claims priority from Japanese Patent Application No. 2010-102267 filed on Apr. 27, 2010. The entire content of this priority application is incorporated herein by reference.

TECHNICAL FIELD

The present invention relates to a computer readable device storing a print control program, a print control apparatus and a print control method.

BACKGROUND

As a printer driver used commonly among a plurality of models of printers, a common printer driver has been conventionally well-known. The common printer driver sets a logical print port having an IP address of a printer selected by an user set therein (for example, TCP/IP port) as a "print port to be used", then prints using the print port.

SUMMARY

The user authority allows a user to execute the common printer driver itself, however, does not generally allow the user to execute print port setting. Instead, the administrator authority allows the user to set a print port through the common printer driver, however, giving any user the administrator authority is not administratively preferable. Such an issue about a print port setting by the user authority has not been considered sufficiently.

An aspect of the present invention provides a computer readable device storing print control instructions to be executed by a computer communicatively connected to at least one printer via a network. The print control instructions comprise at least a monitoring program. The monitoring program, when executed by the computer, causes the computer to function as: a monitoring module configured to monitor setting information in which location information of the printer on the network is written to detect writing of the location information, and a port setting module configured to, upon detection of the writing of the location information, set a logical print port having the written location information set therein as a print port to be used.

Another aspect of the present invention provides an apparatus comprising a processing unit, a storage unit for storing instructions to be executed by the processing unit, and an interface unit configured to be communicatively connected to at least one printer via a network. The instructions comprise a common printer driver and a monitoring program. The common printer driver is used for a plurality of models of printers. The common printer driver, when executed by the processing unit, causes the processing unit to function as: a selecting module configured to select one printer from the at least one printer and a writing module configured to write location information of the selected printer in setting information. The monitoring program, when executed by the processing unit, causes the processing unit to function as: a monitoring module configured to monitor the setting information to detect writing of the location information and a port setting module configured to, upon detection of the writing of the location information, set a logical print port having the written location information set therein as a print port to be used.

Another aspect of the present invention provides a print control method using a computer communicatively connected to at least one printer via a network, the method comprises: a printer selecting step for selecting one printer from the at least one printer; a writing step for writing location information of the selected printer in setting information; a monitoring step for monitoring the setting information to detect writing of the location information, and a port setting step for, upon detection of the writing of location information, setting a logical print port having the written location information set therein as a print port to be used.

BRIEF DESCRIPTION OF THE DRAWINGS

FIG. 5 is a flowchart showing a deleting flow of a TCP/IP port.

DETAILED DESCRIPTION OF THE ILLUSTRATIVE ASPECTS

Illustrative Aspect 1

Illustrative aspect 1 is explained in reference to FIGS. 1 to 5.

(1) Configuration of Computer

Figure 1:
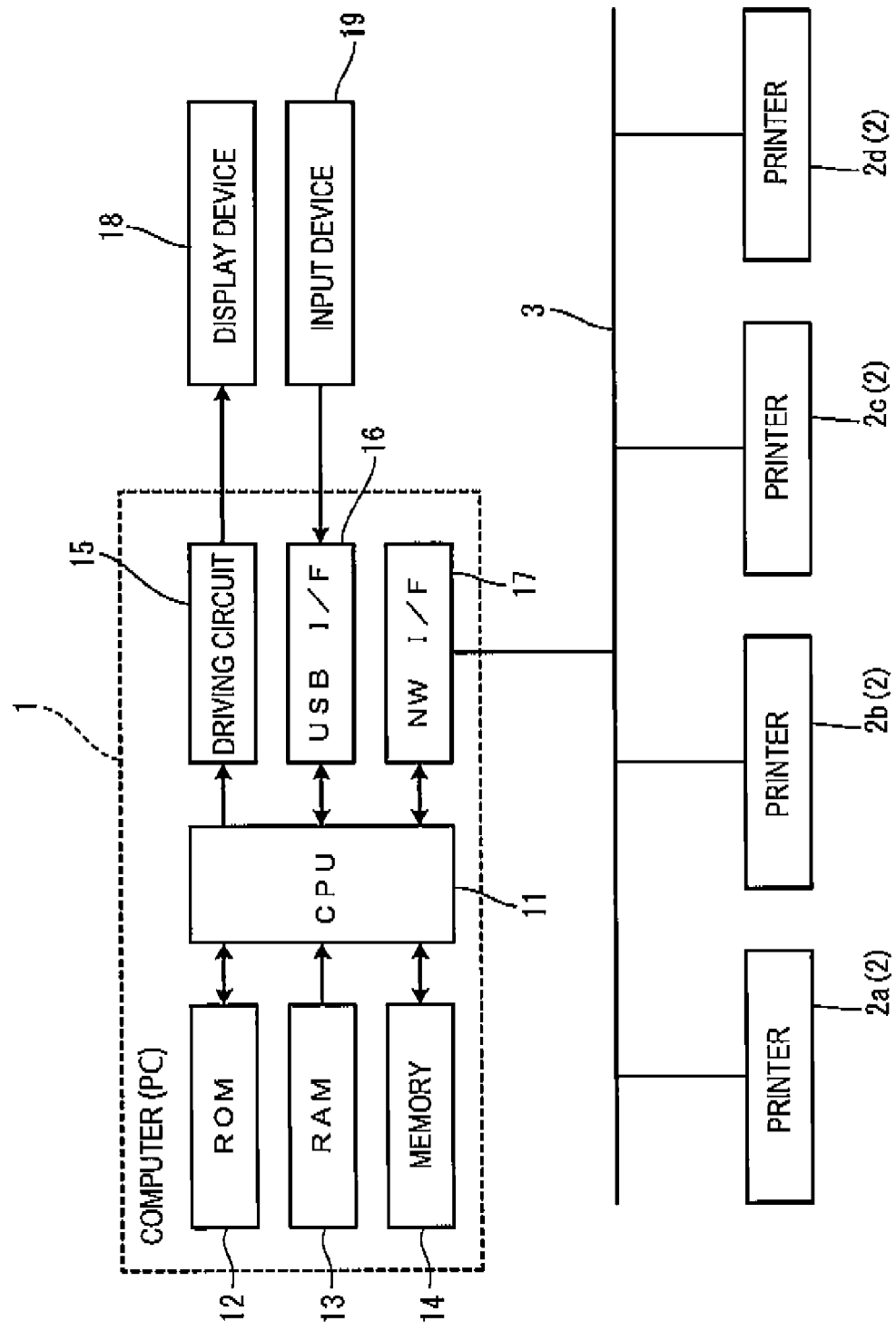
FIG. 1 is a block diagram of a computer according to Illustrative aspect 1 of the present invention.

As shown in FIG. 1, a computer 1 (an example of an apparatus; hereinafter, referred to as "PC") includes a CPU 11, a ROM 12, a RAM 13, a memory 14, a display driving circuit 15, an USB interface (USB I/F) 16, a network interface (NW I/F) 17.

The CPU 11 (an example of a processing unit, which functions as a selecting module, a writing module, a monitoring module, a port setting module, a location information deleting module, a deletion monitoring module, a port deleting module, and a print condition setting module) controls each part of the PC 1 by executing various programs stored in the ROM 12 and the memory (an example of a storage unit) 14. The ROM 12 stores various programs and data to be executed by the CPU 11. The CPU 11 uses the RAM 13 as a main storage device for execution of various processing.

The memory 14 is an external storage device for storing various programs and data with a nonvolatile storage medium, such as a hard disk and a flash memory. The memory 14 stores an operating system (OS), an application program (hereinafter, referred to as "application"), a print control program, an INI file (an example of setting information). The present illustrative aspect is explained using Windows (registered trademark), Microsoft Corporation, as an example of the OS. The OS is not limited to Windows.

The display driving circuit 15 (an example of a selecting module) drives a display device 18, such as a CRT and a liquid crystal display, and is connected thereto via a cable.

The USB interface 16 (an example of a selecting module) is constituted, for example, as an USB (Universal Serial Bus) host interface and connected to an input device 19, such as a mouse and a keyboard, via an USB cable. The network interface (an example of an interface unit) 17 is communicatively connected to one or more printers 2 via the communication network 3, such as a wired or wireless LAN and the internet.

The printer 2 (2a to 2d) is a device for forming images on a recording medium, such as paper, in the electrophotographic technology or the ink-jet technology. A plurality of printers 2 may be of different manufacturers, or of the same manufacturer but different models.

(2) Print Port Setting

Figure 2:
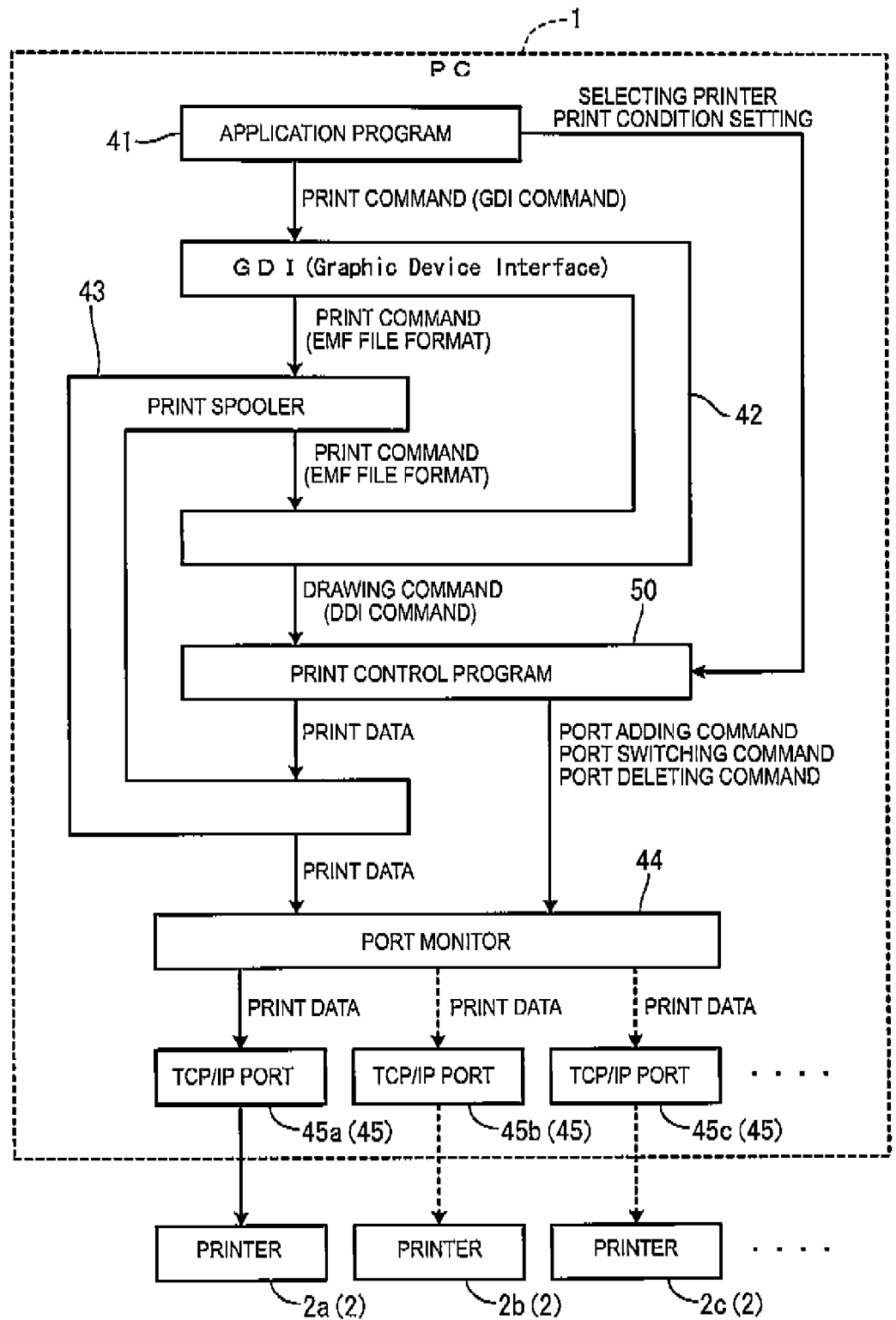
FIG. 2 is a pattern diagram for explaining print port setting.

FIG. 2 is a pattern diagram for explaining print port setting of the print control program 50. Here, a TCP/IP port is used as an example of a print port. The TCP/IP port is a logical communication port for communicating with a printer through a TCP/IP network. Additionally, the TCP/IP port is referred to as Standard TCP/IP port in Windows.

The print port setting is conducted through a port monitor 44. The port monitor 44 is a program supplied as a part of Windows, and does accept commands only from programs executed by the user having the administrator authority.

When received a port adding command from the print control program 50, the port monitor 44 adds the TCP/IP port 45 having an IP address (an example of location information showing a location on the communication network 3) designated by the port adding command set therein. Additionally, the port monitor 44 can add a plurality of TCP/IP ports 45 of different IP addresses and receives a port switching command from the print control program 50, so that any one of the TCP/IP ports 45 becomes available.

When print data is output from the print control program 50 to a print spooler 43 in a state any one of the TCP/IP port 45 is available, the port monitor 44 obtains the print data and outputs to the available TCP/IP port 45 (an example of "print port to be used").

When received a port deleting command from the print control program 50, the port monitor 44 deletes the TCP/IP port 45 having the IP address which is designated by the port deleting command and set in the TCP/IP port 45.

(3) Logical Configuration of Print Control Program

Figure 3:
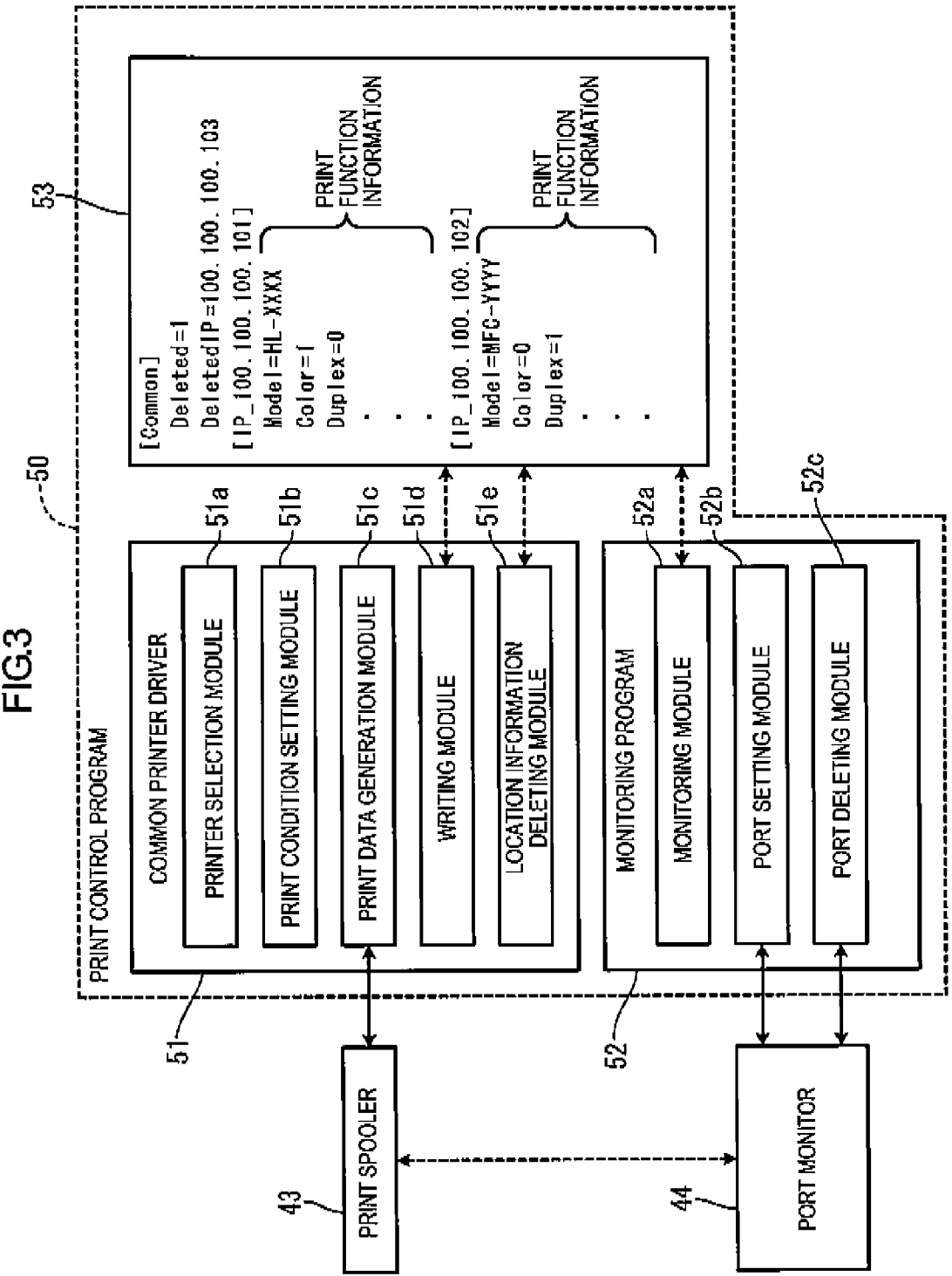
FIG. 3 is a block diagram showing a logical configuration of a print control program.

FIG. 3 is a block diagram showing a logical configuration of the print control program 50. The print control program 50 includes a common printer driver 51, a monitoring program 52, and an INI file 53. The print control program 50 is stored in a computer readable device, for example a CD-ROM, a DVD-ROM, a flash memory drive, a magnetic disc or a hard disk drive, and is used after installed in the PC 1.

(3-1) Common Printer Driver

The common printer driver 51 is used commonly among a plurality of printers 2 of different models. The common printer driver 51 is executed by the user authority and, as mentioned, the port monitor 44 does not accept commands from programs other than the programs executed by the user having the administrator authority. Therefore, the common printer driver 51 cannot directly instruct the port monitor 44 to add or delete print ports.

The common printer driver 51 includes a printer selection module 51a, a print condition setting module 51b, a print data generation module 51c, a writing module 51d, a location information deleting module 51e.

The printer selection module 51a searches the printer 2 connected to a subnetwork same as that connected to the PC1 and enables an user to select one printer 2 from one or more searched printers 2. In particular, the printer selection module 51a displays a printer selection screen (not shown) on the display device 18 for allowing the user to select the printer 2, showing a list of printer name of the searched printers 2 on the printer selection screen. In addition, when the print function information showing print function of the searched printer 2 has been written in the INI file 53, the printer selection module 51a reads the print function information from the INI file 53 and displays on the printer selection screen the print function information with the printer name. On the other hand, when the print function information showing print function of the searched printer 2 has not been written in the INI file 53, the printer selection module 51a obtains the print function information of the printer 2 from the printer 2 and displays on the printer selection screen the print function information together with the printer name.

The print condition setting module 51b is called up by the printer selection module 51a and displays a print condition setting screen (not shown, an example of setting screen) on the display device 18 for users print condition setting. The printers 2 of the same manufacture may have different print functions according to the models, and the print conditions, which can be set on the print condition setting screen, may therefore be different according to the models. The print condition setting module 51b reads the print function information of the selected printer 2 from the INI file 53 and displays the print condition for the print function only of the selected printer 2 on the print condition setting screen for allowing the setting.

The print data generation module 51c generates print data based on a print command output from the application 41 and a print condition set by the print condition setting module 51b. In particular, as shown in FIG. 2, the application 41 outputs a print command (GDI command) to a GDI 42. Then, the GDI 42 converts the print command into a drawing command (DDI command) and outputs the drawing command to the common printer driver 51. The print data generation module 51c generates print data based on the drawing command and the print condition.

The writing module 51d writes in the INI file 53 the IP address of the printer 2 selected by the printer selection module 51a and the print function information associated with the selected printer 2.

The location information deleting module 51e judges whether each printer 2 with its IP address written in the INI file 53 is currently ready for printing or not, deletes the IP address of the printer, which was judged to be not ready for printing, from the INI file 53, and then writes the deletion information showing the deleted IP address in the INI file 53.

The location information deleting module 51e is executed right after the printer selection module 51a was called up by the application 41, then the printer selection module 51a displays a list of only the printers 2, which the location information deleting module 51e judged to be ready for printing, on the printer selection screen. Whether the printer 2 is ready for printing or not may be judged by whether or not the communication with the printer 2 is available. Or, when the communication is available, whether the printer 2 is ready for printing or not may be judged when the remaining amount of ink or the recording medium set in the printer 2 is greater than a predetermined threshold.

(3-2) Monitoring Program

The monitoring program 52 is executed as a resident program referred to as a Windrows service for monitoring the INI file 53 and instructing the port monitor 44 to add/delete a port. The monitoring program 52 is executed by the system authority and can therefore instruct the port monitor 44 to add/delete a port irrespective of the authority.

The monitoring program 52 includes a monitoring module 52a, a port setting module 52b, a port deleting module 52c. The monitoring module 52a constantly monitors the INI file 53 to detect writing or deletion of the IP address in/from the INI file 53.

When writing of the IP address in the INI file 53 is detected by the monitoring module 52a, the port setting module 52b sets the TCP/IP port 45 having the IP address written in the INI file 53 set therein as "print port to be used". In particular, the port setting module 52b designates the IP address written in the INI file 53, outputs a port adding command to the port monitor 44, and then outputs a port switching command for enabling the added TCP/IP port 45 to the port monitor 44.

When deletion of the IP address from the INI file 53 was detected by the monitoring module 52a, the port deleting module 52c deletes the TCP/IP port 45 having the deleted IP address set therein from the INI file 53. In particular, the port deleting module 52c designates the IP address deleted from the INI file 53 and outputs a port deleting command to the port monitor 44.

(3-3) INI File

The INI file 53 is described in a INI file format used for various setting in Windows. The basic configuration of the INI file is as follows.

[Section Name]
  key=value

[Section name] is a row for dividing the INI file into a plurality of sections, and described therein are title texts of a section. An item name of a setting item is described in [key], and a setting value of the setting item in [key] is described in [value].

The sections of [Common] and [IP_XXX.XXX.XXX.XXX] are described in the example of the INI file 53 shown in the figure. The section [IP_XXX.XXX.XXX.XXX] is written by the writing module 51d, and an IP address of the selected printer 2 is written in the part XXX.XXX.XXX.XXX. The print function information showing a print function of the printer 2 of the IP address is described in the setting item.

"Model", "Color", and "Duplex" are examples of print function information. A model name of the printer 2 is described in "Model". In "Color", if the printer 2 is capable of color printing, "1" is written, and if not, "0" is written. In "Duplex", if the printer 2 is capable of double-side printing, "1" is written, and if not, "0" is written.

A plurality of sections [IP_XXX.XXX.XXX.XXX] can be described in the INI file 53. The writing module 51d writes the section [IP_XXX.XXX.XXX.XXX] regarding the selected printer 2 in the bottom of the INI file 53. Writing the section [IP_XXX.XXX.XXX.XXX] of the selected printer 2 in the bottom allows the monitoring program 52 to know the most recently selected printer 2 even from a plurality of sections [IP_XXX.XXX.XXX.XXX].

When the printer 2 having the section [IP_XXX.XXX.XXX.XXX] already written in is selected again, the writing module 51d deletes the written section [IP_XXX.XXX.XXX.XXX], and rewrites the section [IP_XXX.XXX.XXX.XXX] of the printer 2 in the bottom of the INI file 53. This allows the monitoring program 52 to know the most recently selected printer 2.

The location information deleting module 51e writes deletion information in the section [Common]. The setting items "Deleted" and "DeletedIP" are described in the section [Common]. In "Deleted", if the IP address is deleted from the INI file 53, "1" is written, and if not, "0" is written. "0" is set in "Deleted" as an initial value. A deleted IP address is written in the item "DeletedIP". When there is a plurality of printers 2 not ready for printing, "DeletedIP" are written for each of the printers 2.

(4) Print Port Setting Flow

Next, the setting flow for the TCP/IP port 45 is explained. For better understanding, addition and deletion of the TCP/IP port 45 are explained separately.

(4-1) Print Port Adding Flow

Figure 4:
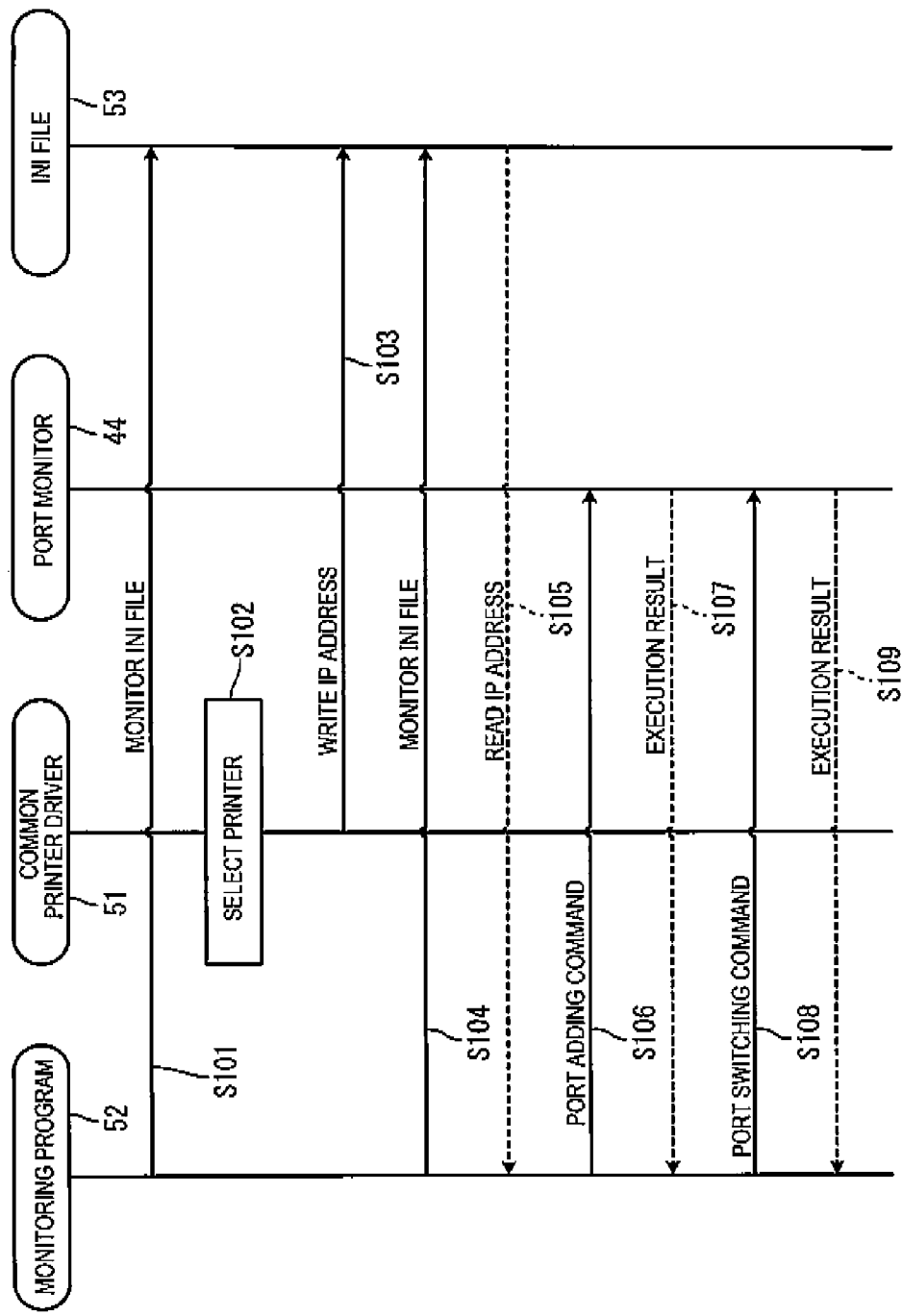
FIG. 4 is a flowchart showing an adding flow of a TCP/IP port.

FIG. 4 is a sequence chart showing an adding flow of the TCP/IP port 45. This processing begins with an user calling up the printer selection module 51a in the common printer driver 51 through the application 41. Here, activation of the PC 1 causes the monitoring program 52 to be automatically activated and constantly monitor the INI file 53 at predetermined intervals.

S101 and S104 are the steps of the monitoring program 52 to monitor the INI file 53. The monitoring program 52 obtains the latest update date and time, including year, month, day, time, minute and second, of the INI file 53 at the predetermined intervals such as one second interval from the OS. If no change is found from the latest update data and time that has been obtained in the previous opportunity, then again obtains the latest update date and time after the predetermined time. The embodiment hereafter involves that an user selects the printer 2 in between the S101 and S104, and, in S104 a change in the latest update date and time is detected by the monitoring program 52.

In S102, the user selects the printer 2 on the printer selection screen displayed by the common printer driver 51. If necessary, the user may call up a print condition setting screen through the printer selection screen and set a print condition. In S103, the common printer driver 51 writes the IP address of the printer 2 selected in S102 in the INI file 53. After saving the INI file 53, the OS updates the latest update date and time of the INI file 53.

In S104, the monitoring program 52 obtains the latest update date and time from the OS, after the predetermined time has elapsed from the latest update date and time of the previous update. The latest update date and time was updated in S103, and the monitoring program 52 therefore detects the change in the latest update date and time in S104. After detecting the change in the latest update date and time, the monitoring program 52 executes the processing in and after S105.

In S105, the monitoring program 52 reads the IP address of the printer 2 from the section [IP_XXX.XXX.XXX.XXX] written in the bottom of the INI file 53.

In S106, the monitoring program 52 calls up an API provided by the port monitor 44, designates the IP address read in S105, and outputs a port adding command to the port monitor 44.

In S107, in response to receiving the port adding command, the port monitor 44 adds the TCP/IP port 45 having the designated IP address set therein and gives the execution result (success or failure) back to the monitoring program 52 as a return value. Here, a failure given back as the execution result means that the TCP/IP port 45 having the IP address set therein has already been set.

In S108, the monitoring program 52 calls up an API provided by the port monitor 44, designates the TCP/IP port 45 added in S106, and outputs a port switching command to the port monitor 44. If the execution result was failure, the monitoring program 52 designates the already present TCP/IP port 45), and outputs a port switching command to the port monitor 44.

In S109, in response to receiving the port switching command, the port monitor 44 enables the TCP/IP port 45 having the designated IP address set therein and gives the execution result (success or failure) back to the monitoring program 52 as a return value.

(4-2) Print Port Deleting Flow

FIG. 5 is a sequence chart showing a deleting flow of the TCP/IP port 45. This processing begins when the user calls up the printer selection module 51a in the common printer driver 51 through the application 41. Here, the processing same as those in FIG. 4 are allocated with the same symbols, so that a repetitive description is omitted.

In S201, the common printer driver 51 judges whether each printer 2 having its IP address written in the INI file 53 is currently ready for printing or not. If the printer 2 was judged to be not ready for printing, the common printer driver 51 executes the processing in and after S202.

In S202, the common printer driver 51 deletes the section [IP_XXX.XXX.XXX.XXX] having the IP address of the printer 2, which has been judged to be not ready for printing, written therein from the NI file 53, while writing "1" in "Deleted" and writing the IP address of the printer 2 in "DeletedIP". After saving the INI file 53, the OS updates the latest update date and time of the INI file 53.

In S203, the monitoring program 52 firstly reads the value in "Deleted" from the INI file 53, then judges whether the value is "1" (the IP address is deleted) or not. Here, the value is "1" according to S202, and the monitoring program 52 therefore reads the value, such as the deleted IP address, in "DeletedIP" from the INI file 53.

In S204, the monitoring program 52 calls up an API provided by the port monitor 44, designates the IP address read in S203, and outputs a port deleting command to the port monitor 44.

In S205, in response to receiving the port deleting command, the port monitor 44 deletes the TCP/IP port 45 having the IP address set therein and gives the execution result (success or failure) to the monitoring program 52 as a return value. In S206, the monitoring program 52 deletes the deletion information from the INI file 53. Specifically, the monitoring program 52 writes "0" in "Deleted" in the section [Common] and deletes the IP address from "DeletedIP".

(5) Effect of Illustrative Aspect

According to the print control program 50 in the above-mentioned Illustrative aspect 1, when the common printer driver 51 writes an IP address in the INI file 53, the TCP/IP port 45 having the written IP address set therein is set as "TCP/IP port to be used" by the monitoring program 52. Therefore, writing an IP address of the printer 2 in the INI file allows the common printer driver 51 to set the TCP/IP port 45, even when being executed by the user authority. Accordingly, it is not necessary to give a user the administrator authority for the purpose of allowing the common printer driver 51 to set the TCP/IP port 45.

Furthermore, when an IP address of the selected printer 2 has been already written in the INI file 53, the IP address is deleted and new one is written in, so that the print control program 50 detects writing of the IP address in the INI file 53. Therefore, even when the printer 2 having its IP address already written in the INI file 53 is selected once again, the print port having the IP address of the printer 2 set therein can be set as "print port to be used".

Furthermore, in the print control program 50, the common printer driver 51 deletes the IP address from the INI file 53, so as to delete the TCP/IP port 45 even when being executed by the user authority.

Furthermore, in the print control program 50, the deletion information showing the IP address deleted from the INI file 53 is written in the INI file 53, so that the monitoring program 52 knows which IP address has been deleted from the INI file 53.

Furthermore, in the print control program 50, deleting the TCP/IP port 45 having the IP address of the printer 2 not ready for printing set therein can avoid the unnecessary TCP/IP port 45 to remain.

Furthermore, the print control program 50 writes the IP address associated with the print function information in the INI file 53 and displays the same on the printer selection screen, so that an user easily select the printer 2 according to purposes.

Additionally, in the monitoring program 52 according to Illustrative aspect 1, the common printer driver 51 writes the IP address of the selected printer 2 in the INI file 53, and thereby setting the TCP/IP port 45 even when being executed by the user authority.

Other Illustrative Aspects

The scope of the present invention is not limited to the illustrative aspects described above with reference to the accompanying figures. The following can also be included in the technical scope of the present invention.

(1) Instead of the IP address, a node name may be the location information. A node name is the information capable of uniquely specifying a device and equivalent to a domain name in a TCP/IP network. A domain name is converted into an IP address by referring DNS (Domain Name System), and thereby uniquely specifying a device.

(2) Instead of the print function information, a print condition set on the print condition setting screen may be written in the INI file 53. When setting a print condition for the selected printer 2, the print condition associated with the IP address of the printer 2 and written in the INI file 53 may be displayed on the print condition setting screen as an initial value. Accordingly, in the next print condition setting, a user do not have to set the same print condition same as the previous printing.

(3) In the above illustrative aspect, an INI file is introduced as setting information, However, when using Windows of Microsoft Corporation as an OS, a registry instead of the INI file may be used as setting information.

What is claimed is:

1. A non-transitory computer readable medium storing print control instructions, the print control instructions including:
   a port monitor configured to add a logical print port; and
   a common printer driver executable with a user authority,
   wherein the common printer driver, when executed by a computer with the user authority, causes the computer to:
   select a printer of a plurality of printers connected to the computer via a network; and
   write network location information of the selected printer on the network in setting information stored in a memory of the computer,
   wherein the print control instructions further include a monitoring program that is executable with a system authority, the monitoring program, when executed by the computer with the system authority, causes the computer to:
   monitor, at predetermined intervals, the setting information in the memory and detect whether the network location information is written in the setting information;
   read the network location information from the setting information in response to detecting that the network location information is written in the setting information;

input a port adding command for adding a logical print port specified by the read network location information to the port monitor, wherein the port monitor is executed with the system authority; and set the logical print port designated by the read network location information read from the setting information and added based on the port adding command as a print port used via the common printer driver.

2. The computer readable medium according to claim 1, wherein:

when the network location information of the selected printer has already been written in the setting information, the common printer driver further causes the computer to:

delete the network location information already written in the setting information, and subsequently write the network location information of the selected printer in the setting information.

3. The computer readable medium according to claim 1, wherein:

the common printer driver further causes the computer to:

delete the network location information from the setting information; and the monitoring program further causes the computer to:

monitor the setting information to detect deletion of the network location information, and upon detection of the deletion of the network location information, delete the logical print port designated by the deleted network location information.

4. The computer readable medium according to claim 3, wherein the monitoring program further causes the computer to:

judge whether or not each printer having the network location information written in the setting information is ready for printing; and delete network location information of a printer, which is judged to be not ready for printing, from the setting information.

5. The computer readable medium according to claim 1, wherein the common printer driver further causes the computer to write deletion information in the setting information, the deletion information including deleted network location information, and wherein the monitoring program further causes the computer to delete the print port designated by the network location information written in the deletion information.

6. The computer readable medium according to claim 1, wherein:

writing the network location information of the selected printer in the setting information includes:

obtaining print function information from the selected printer, the print function information specifying one or more print functions of the selected printer, and writing the network location information associated with the print function information in the setting information; and selecting the printer of the plurality of printers includes:

retrieving the print function information from the setting information for the selected printer having the network location information written in the setting information, and displaying, on a display device, the retrieved print function information for the selected printer for allowing a user to select a printer.

7. The computer readable medium according to claim 1, wherein:

selecting the printer of the plurality of printers includes, for another printer:

obtaining the print function information from the other printer, and displaying, on a display device, the obtained print function information for the other printer for allowing an user to select a printer; and the other printer has network location information not written in the setting information.

8. The computer readable medium according to claim 1, wherein the common printer driver further causes the computer to:

display a setting screen for print condition setting on a display device for allowing a user to set a print condition, write, in the setting information, the network location information of the selected printer and the set print condition, the network location information being associated with the set print condition, and display the set print condition, which is associated with the network location information of the selected printer and is written in the setting information, as an initial print condition in the setting screen.

9. The non-transitory computer readable medium according to claim 1, wherein the monitoring program, when executed by the computer with the system authority, causes the computer to:

determine whether the logical print port designated by the read network location information is added and set as the print port to be used; and in response to determining that the logical print port designated by the read network location information is set as the print port to be used, output a port switching command and cause the port monitor to change the designated logical print port to an active status, wherein the common print driver, when executed by the computer with the user authority, further causes the computer to send print data to the selected printer via the logical print port set to the active status.

10. An apparatus comprising:

a processor;

a storage unit storing instructions, including a common printer driver, a port monitor configured to add a logical print port, and a monitoring program, to be executed by the processor; and an interface configured to be connected to a plurality of printers via a network, wherein:

the common printer driver is executable with a user authority, and, when executed by the processor with the user authority, causes the apparatus to:

select a printer from the plurality of printers; and write network location information of the selected printer on the network in setting information stored in the storage unit, and the monitoring program is executable with a system authority, and, when executed by the processor, causes the apparatus to:

monitor, at predetermined intervals, the setting information stored in the storage unit and detect writing of the network location information in the setting information;

read the network location information from the setting information in response to detecting the writing of the network location information in the setting information;

input a port adding command for adding a logical print port specified by the read network location information to the port monitor, wherein the port monitor is executed with the system authority; and set the logical print port designated by the read network location information and added based on the port adding command as a print port used via the common printer driver.

11. The apparatus according to claim 10, wherein, when previous network location information of the selected printer has already been written in the setting information, the common printer driver causes the apparatus to:

delete the previous network location information already written in the setting information, and subsequently write the network location information of the selected printer in the setting information.

12. The apparatus according to claim 10, wherein:

the common printer driver further causes the apparatus to:

delete the network location information from the setting information; and the monitoring program further causes the apparatus to:

monitor the setting information to detect deletion of the network location information, and upon detection of the deletion of the network location information, delete the print port designated by the deleted network location information.

13. The apparatus according to claim 12, wherein the common print driver further causes the apparatus to:

judge whether or not each printer having the network location information written in the setting information is ready for printing; and delete network location information of a printer, which is judged to be not ready for printing, from the setting information.

14. The apparatus according to claim 10, wherein the common print driver further causes the apparatus to:

delete the network location information from the setting information;

write deletion information in the setting information, the deletion information including the deleted network location information; and delete the print port designated by the network location information of the deletion information.

15. The apparatus according to claim 10, wherein writing the network location information of the selected printer in the setting information includes:

obtaining print function information from the selected printer, the print function information specifying one or more print functions of the selected printer; and writing the network location information associated with the print function information in the setting information, and wherein selecting the printer from the plurality of printers includes:

retrieving the print function information from the setting information for the selected printer having the network location information written in the setting information, and displaying, on a display device, the retrieved print function information for the selected printer for allowing a user to select a printer.

16. The apparatus according to claim 10, wherein:

selecting the printer from the plurality of printers includes, for another printer:

obtaining print function information from the other printer; and displaying, on a display device, the obtained print function information for the other printer for allowing an user to select a printer, and the other printer having network location information not written in the setting information.

17. The apparatus according to claim 10, wherein the common printer driver further causes the apparatus to:

display a setting screen for print condition setting on a display device for allowing a user to set a print condition, write, in the setting information, the network location information of the selected printer and the set print condition, the network location information being associated with the set print condition, and display the set print condition, which is associated with the network location information of the selected printer and is written in the setting information, as an initial print condition in the setting screen.

18. A method using a computer communicatively connectable to a plurality of printers via a network, the method comprising:

executing, with a user authority, a common printer driver included in print control instructions, including:

a printer selecting step for selecting a printer from the plurality of printers connected to the computer via a network;

a writing step for writing network location information of the selected printer on the network in setting information stored in a memory of the computer; and executing a monitoring program also included in the print control instructions, including:

a monitoring step for monitoring, at predetermined intervals, the setting information stored in the memory and detect whether the network location information is written in the setting information, a reading step for reading the network location information from the setting information when detecting that the network location information is written in the setting information;

an inputting step for inputting a port adding command configured to add a logical print port specified by the read network location information to a port monitor included in the print control instructions, wherein the port monitor is executed with a system authority; and a port setting step for setting the logical print port designated by the read network location information as a print port used via the common print driver, wherein the common printer driver is executable with the user authority, and wherein the monitoring program is executable with the system authority.

19. The method according to claim 18, wherein, the writing step includes, when previous network location information of the printer has been written in the setting information, deleting the previous network location information and then writing the network location information of the selected printer in the setting information.

20. The method according to claim 18, wherein:

executing the common printer driver further includes a network location information deleting step for deleting the network location information from the setting information, and executing the monitoring program further includes:
- a deletion monitoring step for monitoring the setting information to detect deletion of the network location information; and
- a port deleting step for, upon detecting deletion of the network location information, deleting the print port designated by the deleted network location information.

* * * * *